United States Patent [19]

Farris

[11] 4,159,690
[45] Jul. 3, 1979

[54] AUTOMATIC LANDING SYSTEM FOR HYDROFOIL CRAFT

[75] Inventor: William E. Farris, Bellevue, Wash.

[73] Assignee: The Boeing Company, Seattle, Wash.

[21] Appl. No.: 858,237

[22] Filed: Dec. 7, 1977

[51] Int. Cl.$^2$ .............................................. B63B 1/30
[52] U.S. Cl. .................................. 114/275; 244/180; 318/588
[58] Field of Search ................ 114/275, 282; 318/564, 318/566, 588; 244/180

[56] References Cited

U.S. PATENT DOCUMENTS

| | | | |
|---|---|---|---|
| 3,800,727 | 4/1974 | Stark | 114/275 |
| 3,886,884 | 6/1975 | Stark | 114/275 |

*Primary Examiner*—Trygve M. Blix
*Assistant Examiner*—Reinhard J. Eisenzopf
*Attorney, Agent, or Firm*—Thomas H. Murray

[57] ABSTRACT

A control system for a hydrofoil characterized in that a transition from the foil-borne to the hull-borne mode of operation is initiated and the craft caused to descend or land automatically due to a failure in the primary power source for the control system or some other off-normal condition. The invention constitutes an improvement in prior art systems of this type in that, should the primary power source fail, an auxiliary gyroscope automatically provides stabilization about the roll axis to the unstable craft. This causes the craft to maintain an essentially level deck attitude or, should the craft be in a turn, to roll out of an inclined deck attitude toward a level deck attitude as the craft descends to the hull-borne mode of operation subsequent to primary power source failure. In this manner, the severity of impact with the water as the craft descends during a turning maneuver is reduced. An additional gyroscope can be provided to reduce or prevent pitching movements of the craft as it descends during automatic landing due to an off-normal condition such as loss of power in the primary control system.

5 Claims, 4 Drawing Figures

AUTOMATIC LANDING SYSTEM FOR HYDROFOIL CRAFT

BACKGROUND OF THE INVENTION

In known types of hydrofoil seacraft, the hull of the craft is lifted out of the water by means of foils carried on struts which pass through the water beneath the surface thereof. In passing through the water, and assuming that sufficient speed is attained, the foils create enough lift to raise the hull above the surface and, hence, eliminate the normal resistance encountered by a ship hull in passing through the water.

In the usual case, there are forward and aft foils, both provided with control flaps similar to those used on aircraft. The other essential element is the rudder which pierces or is submerged beneath the surface of the water and is either forward or aft of the craft, depending upon its design. In most hydrofoils, the flaps are used primarily to cause the craft to ascend or descend and to control the craft about its pitch and roll axes; however they are also used in combination with the rudder to bank the craft about its roll axis during a turn. A typical control system for hydrofoils of this type is shown in U.S. Pat. No. 3,886,884, issued June 3, 1975 and assigned to the Assignee of the present application.

In any hydrofoil control system, safety is a paramount factor to be taken into consideration. In this respect, provision should be made for causing the craft to descend from its foil-borne to its hull-borne mode of operation quickly and automatically in the event of a primary electronic power source failure or some other off-normal condition before an unsafe roll or yaw attitude is developed while the craft is foil-borne with its hull elevated above the water surface.

In U.S. Pat. Nos. 3,800,727, issued Apr. 2, 1974, and also assigned to the Assignee of the present application, such a system is described for automatically initiating a transition from the foil-borne to the hull-borne mode of operation of a hydrofoil craft upon the occurrence of a power failure or other off-normal condition. The invention described in U.S. Pat. No. 3,800,727 provides for two separate servo systems for controlling the rudder and each of the flaps on the foils or control surfaces of a hydrofoil craft. One servo system for each control surface is powered by the main power supply for the craft, usually an alternating current power source; while the other system is powered by a separate source, usually batteries providing direct current. During normal operation of the craft, both the alternating current servo system and the alternate direct current powered servo system are connected to the flap actuators. However, control of the control surface positions is dominated by the alternating current system which causes the control surfaces to position in response to commands from the pilothouse as well as motion sensing devices. But upon a failure of the main control system, the direct current auxiliary servo system, which provides a small control command at all times, takes over and causes the control surfaces to move to predetermined positions which will force the craft to land rapidly. Since the auxiliary feedback null positions for an automatic landing, no landing commands are necessary from the pilothouse.

While the system shown in U.S. Pat. No. 3,800,727 operates entirely satisfactorily while the craft is in straight-away operation at the instant of a primary power failure, if the power failure should occur during a turning maneuver, the craft attitudes and rates and the forces resulting from impacting the water are very severe, even for very moderate initial turn rates.

SUMMARY OF THE INVENTION

In accordance with the present invention, an improved automatic landing system for a hydrofoil craft is provided in which an auxiliary or secondary electrical servo system, which commands the craft when a failure in the primary power system occurs, incorporates gyroscope means which automatically maintains the craft in a level deck attitude or causes the craft to roll out of an inclined deck attitude toward an essentially level deck attitude as the craft descends to a hull-borne mode of operation. Thus, even though the craft should be in a turn when a primary power failure occurs, the gyroscope means in the secondary servo system will position the flaps on the hydrofoil to cause it to roll toward a level deck condition prior to impact with the water. This eliminates the possibility of exceptionally large forces which would otherwise be encountered on impact when the craft descends during a turning maneuver.

The invention is incorporated into a control system for a hydrofoil craft of the type having at least one control surface, electrical circuit means including a primary servo system for controlling the control surface during a normal operation of the hydrofoil, and a primary source of electrical power for the electrical circuit means. The invention itself resides in the improvement of auxiliary circuit means including a secondary servo system and a secondary source of electrical power for automatically positioning the control surface to cause the hydrofoil craft to descend from a foil-borne to a hull-borne mode of operation upon the occurrence of a failure in the primary power source. Gyroscope means is incorporated into the auxiliary electrical circuit means and is operable when a failure in the primary power source occurs when the hydrofoil craft is turning for automatically causing the craft to roll out of an inclined deck attitude to an essentially level deck attitude as the craft descends to a hull-borne mode of operation. Advantageously, the invention can also incorporate gyroscope means in the auxiliary electrical circuit means for eliminating pitching movements of the craft as it descends during the automatic landing mode of operation.

The above and other objects and features of the invention will become apparent from the following detailed description taken in connection with the accompanying drawings which form a part of this specification, and in which.

Figure 1:
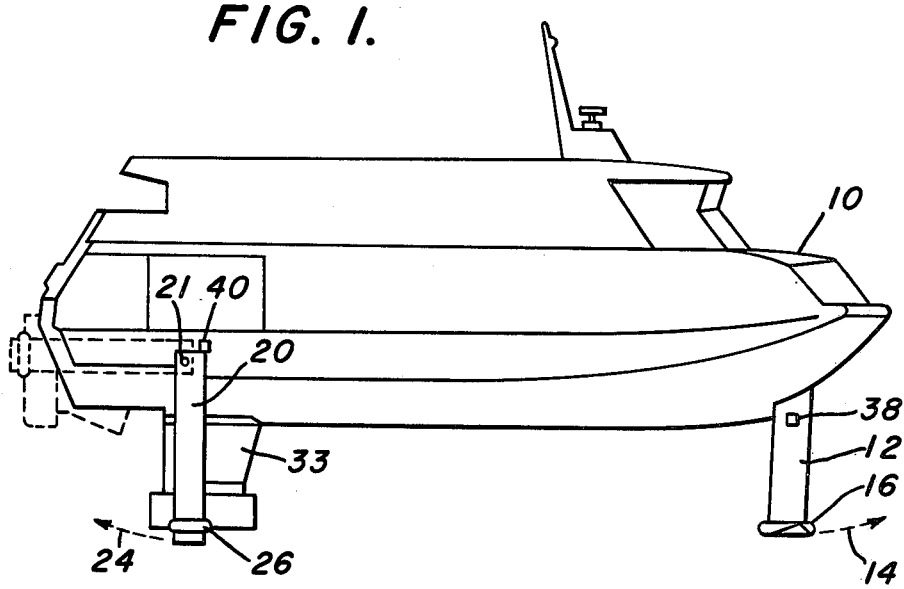
FIG. 1 is a side view of a typical hydrofoil craft with which the control system of the invention can be used.

With reference now to the drawings, and particularly to FIG. 1, the hydrofoil shown includes a conventional hull 10 which can be provided with a propeller or the like and an inboard motor, not shown, in order that it can traverse the surface of water as a conventional displacement ship. Pivotally connected to the hull is a forward, swiveled strut or rudder 12 which is rotatable about a vertical axis in order to steer the craft in the foil-borne mode of operation. The rudder 12 can also be swiveled upwardly in the direction of arrow 14 to clear the surface of the water when the craft is operating as a conventional displacement ship. Carried on the lower end of the rudder 12 is a forward foil 16 (FIG. 2) which carries at its trailing edge control surfaces or flaps 18 which are interconnected and operate in synchronism. Alternatively, the forward foil can be rotated for control. In this respect, it can be said that there is a single forward control, be it flap or incidence (i.e., forward foil) means.

In the aft portion of the craft, struts 20 and 22 are pivotally connected to the hull 10 about an axis 21. The struts 20 and 22 can be rotated downwardly into the solid-line position shown in FIG. 1 for foil-borne operation, or can be rotated backwardly in the direction of arrow 24 and into the dotted-line position shown when the craft operates as a conventional displacement ship. Extending between the lower ends of the struts 20 and 22 is an aft foil 26 which carries, at its trailing edge, two starboard flaps 28 and 30 and two port flaps 32 and 34. Alternatively, the starboard and port foils can be rotated themselves. As will be seen, each set of starboard flaps and each set of port flaps normally operate in synchronism.

Carried between the struts 20 and 22 and pivotally connected to the hull 10 about axis 21 is an intake 33 for a gas turbine-water jet propulsion system which provides the forward thrust for the craft during foil-borne operation. It should be understood, however, that a propeller or other type of thrust-producing device can be used in accordance with the invention.

With the rudder 12 and struts 20 and 22 retracted, the craft may transit in the hull-borne mode. In the foil-borne mode of operation, both the rudder 12 and its foil 16, and struts 20 and 22 with foil 26, are rotated downwardly into the solid-line positions shown in FIG. 1 and locked in oposition. In order to become foil-borne, the pilot sets the desired foil depth in a manner hereinafter described and the throttles are advanced. The craft, therefore, will accelerate and the hull will clear the water and continue to rise until it stabilizes at the commanded foil depth. The normal landing procedure is to simply reduce the throttle setting, allowing the ship to settle to the hull as the speed decays.

Figure 2:
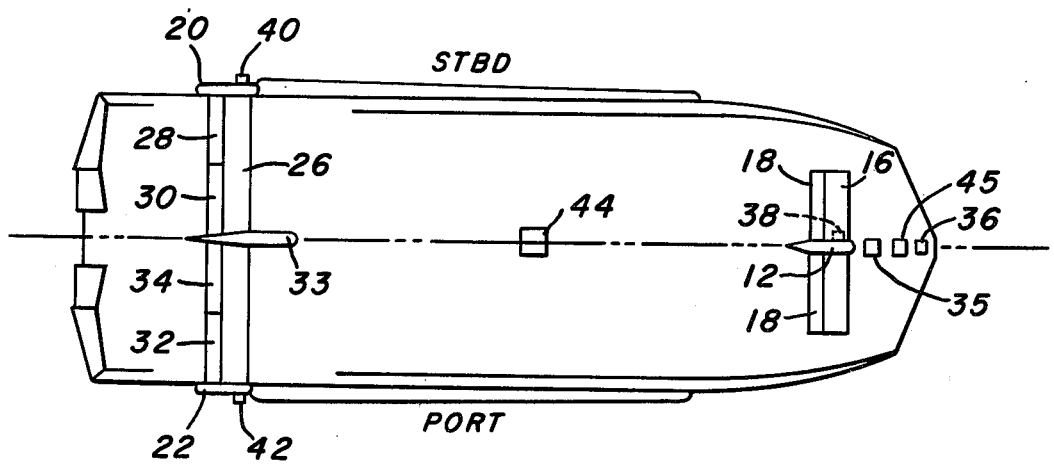
FIG. 2 is a bottom view of the craft shown in FIG. 1.

Mounted on the hull, as shown in FIG. 2, are sensors for producing electrical signals indicative of craft motion. Thus, at the bow of the craft is a height sensor 36 which produces an electrical signal proportional to the height of the bow above the surface of the water during foil-borne operation. Also at the bow of the ship is a forward vertical accelerometer 35 which produces an electrical signal proportional to vertical acceleration. Mounted on the support for the rudder 12 is a lateral accelerometer 38 which, of course, produces an electrical signal proportional to lateral or sideways acceleration of the craft during turning. Mounted on the top of the starboard strut 20 is an aft starboard vertical accelerometer 40; and mounted at the top of the port strut 22 is an aft port vertical accelerometer 42. A vertical gyro 44 is mounted in the craft, preferably near the center of gravity, for producing signals proportional to the angle of the craft with respect to vertical about its pitch and roll axes. Finally, a yaw rate gyro 45 is provided in the forward portion of the craft. The accelerometers and the gyros will sense motions of the craft about its roll, pitch and yaw axes.

Any movement about the roll axis will be sensed by the vertical gyro 44 as well as the aft accelerometers 40 and 42. The gyro 44 will produce an output signal proportional to the amount or degree of roll; while the accelerometers 40 and 42 will produce signals proportional to the rate of change in position about the roll axis. Any movement about the pitch axis will be sensed by the vertical gyro 44 as well as both the forward and aft accelerometers 35, 40 and 42. Finally, any movement about the yaw (i.e., vertical) axis will be sensed by the yaw rate gyro 45 as well as the lateral accelerometer 38.

In the normal control of the hydrofoil shown herein, the height of the hull above the water is controlled solely by the forward flap 18. In order to raise the hull from the surface of the water, the forward flap is rotated downwardly, thereby increasing the lift afforded by the forward foil 16 and causing the hull to elevate out of the water. In order to eliminate or minimize the pitching motions about the pitch axis, both the forward and aft flaps are employed. However, the forward and aft flaps operate in opposite directions to correct any pitch condition. For example, if the bow of the craft should dip, the forward flap 18 will be rotated downwardly; while the aft flaps 28-32 will be rotated upwardly to produce a moment counterbalancing that pitching moment caused by waves or the like. Compensation for movement about the roll axis is achieved slowly by the aft flaps 28-32; however, in this case the starboard flaps move in a direction opposite to the port flaps to correct for any undesired rolling motion. In turning the craft, the aft flaps are initially positioned to cause the craft to bank about its roll axis; whereupon the rudder 12 is rotated to follow through. This gives a much better and smoother turning action since the correct roll inclination is achieved before any substantial turning of the craft occurs via the rudder.

The particular hydrofoil shown herein and the control system about to be described is the subject matter of the aforesaid U.S. Pat. No. 3,886,884 and assigned to the Assignee of the present application. As was explained above, however, the invention can be used with any hydrofoil control system, the essential feature being the inclusion of secondary servo systems for the control surfaces of the craft which cause it to land or descend onto the water automatically upon the occurrence of a failure of the normal alternating current power supply for the control system. In the particular control system of FIG. 3, the signal from the height sensor 36 proportional to actual height is compared with the desired height signal from the pilothouse depth control 68 on lead 66 in a depth error amplifier 74. If the two signals fed to the amplifier 74 are not the same, then a signal is developed on lead 76 and applied to a forward flap servo system 78 which causes the forward flap 18 is rotate downwardly or upwardly, depending upon whether the hull should rise or descend. When it is desired to turn the craft about its yaw axis, a signal on lead 70 derived from the helm 72 and proportional to helm position is applied to a roll derivative amplifier 80 where it is compared with a signal on lead 82 from vertical gyro 44 proportional to the roll angle about the yaw axis relative to vertical.

At the beginning of a turn, and assuming that the water through which the hydrofoil is traveling is smooth, the signal on lead 82 will be zero, or substantially zero. The roll derivative amplifier compares the signal on lead 82 with that on lead 70; and assuming that the two are not the same, as is the case for the conditions just described, then an output signal appears at the output of the amplifier 80 and is applied to inboard and outboard port flap servos 84 and 86. At the same time, it is applied in an inverted form to the inboard and outboard starboard flap servos 88 and 90. The result, of course, is that one set of aft flaps will rotate downwardly while the other set rotates upwardly to cause the craft to bank about its roll axis. This action will continue until the angle of roll as sensed by the gyro 44 is such as to generate a signal which nulls out the helm signal on lead 70.

However, at the same time, the signal on lead 82, proportional to roll angle, is also applied to a rudder servo 92. This causes the rudder 12 to rotate after the craft begins to bank about its roll axis, causing the craft to turn in the direction to which the craft has been banked. Thus, if the craft turns to the right in response to a signal from helm 72, the rudder 12 will thereafter rotate to steer the craft to the right. This gives a much smoother turn for all sea conditions encountered with a minimum of acceleration forces on the passengers and crew.

As the ship turns, the yaw rate gyro 45 will produce a signal on lead 94 proportional to the rate of turning about the yaw axis; and this is utilized in the rudder servo 92 to limit the rate of turning. The same is true of the forward lateral accelerometer 38 which produces a signal on lead 96 proportional to lateral acceleration. Thus, if the craft is turning into a position where it is broadside to the direction of a strong wind and accompanying waves, the yaw rate gyro 45 will sense the thrust on the craft and limit the rate of turning. Of course, after the desired turn is executed and the helm 72 rotated back to its center or null position, the signal on lead 70 decreases back to zero; whereupon the positions of the aft flaps are reversed to cause the craft to come back up into a vertical position about the roll axis. At this point, the output of the vertical gyro 44 on lead 82 decreases to zero, the rudder 12 is centered, and the craft is again stabilized.

The remaining control actions are primarily for the purpose of eliminating or minimizing undesirable pitching and rolling actions. Thus, the forward accelerometer 35 senses acceleration, either upward or downward, at the bow and produces an electrical signal for controlling the forward flap 18 to counteract movement about the pitch axis 62. The output of the forward accelerometer 35, however, is combined in integral amplifier 100 with a signal proportional to the roll signal squared as derived from circuit 98 before the combined signal is applied to the forward flap servo 78. This is for the reason that during a turn and while the craft is being banked about its roll axis, and during normal rolling action in heavy seas, the rolling movement produces a component of vertical acceleration which must be taken into consideration.

A signal proportional to the angle of the craft about the pitch axis is derived from vertical gyro 44 on lead 102. This is applied to a pitch derivative amplifier 104 which produces an output signal which varies as a function of pitch angle from horizontal and the rate of change of pitch angle. The output of the pitch derivative amplifier 104 is then applied to all of the aft flap servos and is also applied in an inverted form to the forward flap servo 78 to achieve differential control. This signal is used for stability augmentation, ride smoothing in a seaway, and automatic pitch trim control.

Assuming that the craft is rolling about its roll axis, a signal will be derived on lead 82 which is again applied to the roll derivative amplifier 80. The signal on lead 82 under these circumstances will first increase in one direction or polarity, then recede back to zero and increase in the other direction or other polarity and again recede back to zero as the craft rolls from side-to-side. This again produces at the output of the roll derivative amplifier a signal which varies as a function of both the roll angle as well as the rate of change of roll angle. The signal is applied to the aft port and starboard servos so as to achieve differential action that counteracts the rolling movement. In other words, a signal of one polarity is applied to the port flap servo; while a signal of inverted polarity is applied to the starboard flap servo to achieve rotation of the respective port and starboard flaps in opposite directions to counteract a rolling motion.

The output of the port vertical accelerometer 42 is applied to both the inboard and outboard port flap servos 84 and 86 and acts to vary the aft port flap position to counteract any vertical acceleration or heave on the port side. Similarly, the output of the starboard vertical accelerometer 40 is applied to both the inboard and outboard starboard flap servos 88 and 90 to achieve the same action and counteract vertical accelerations on the starboard side of the craft.

Figure 3:
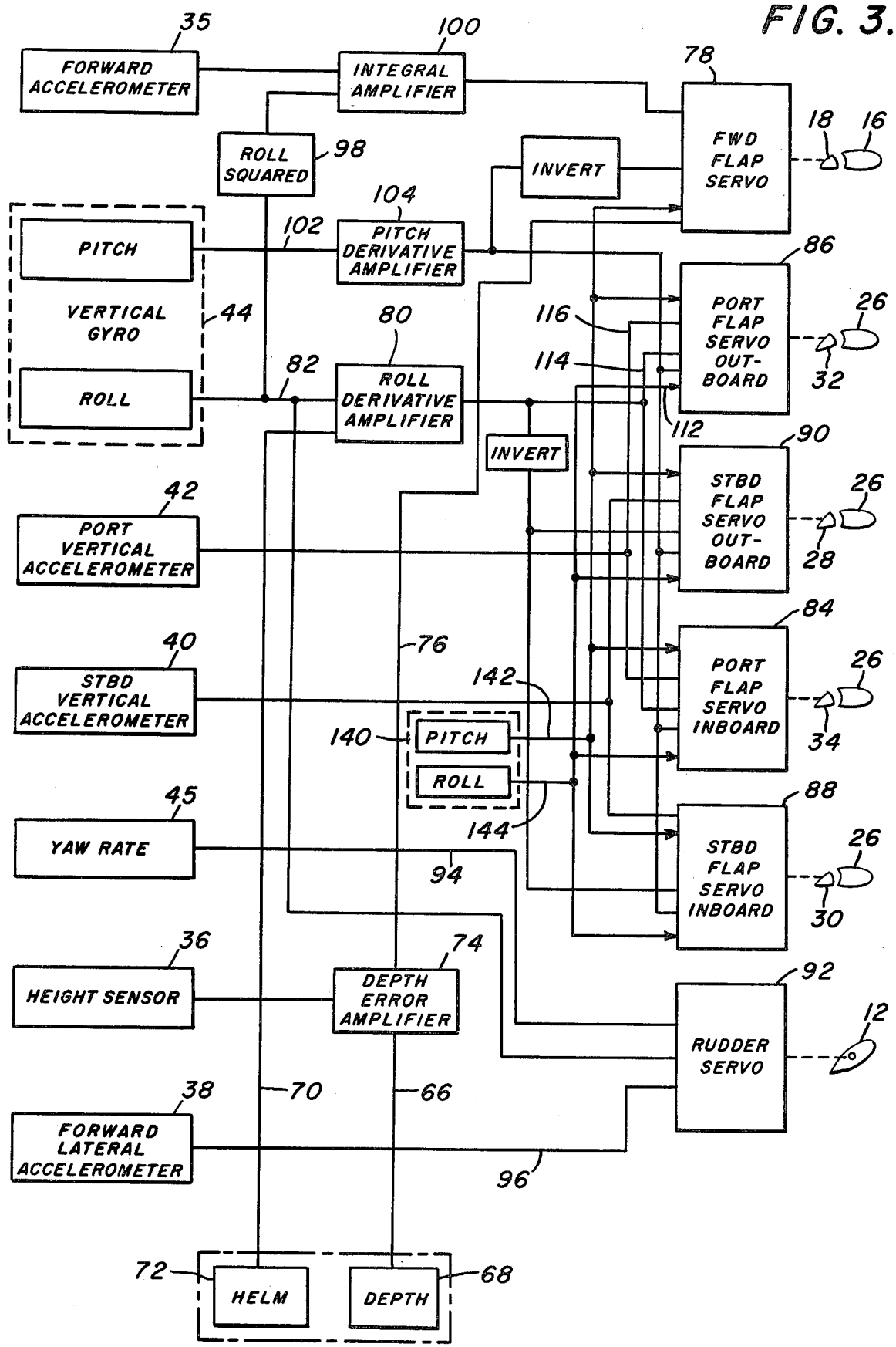
FIG. 3 is a block schematic diagram showing in general outline the normal control system for the craft.
Figure 4:
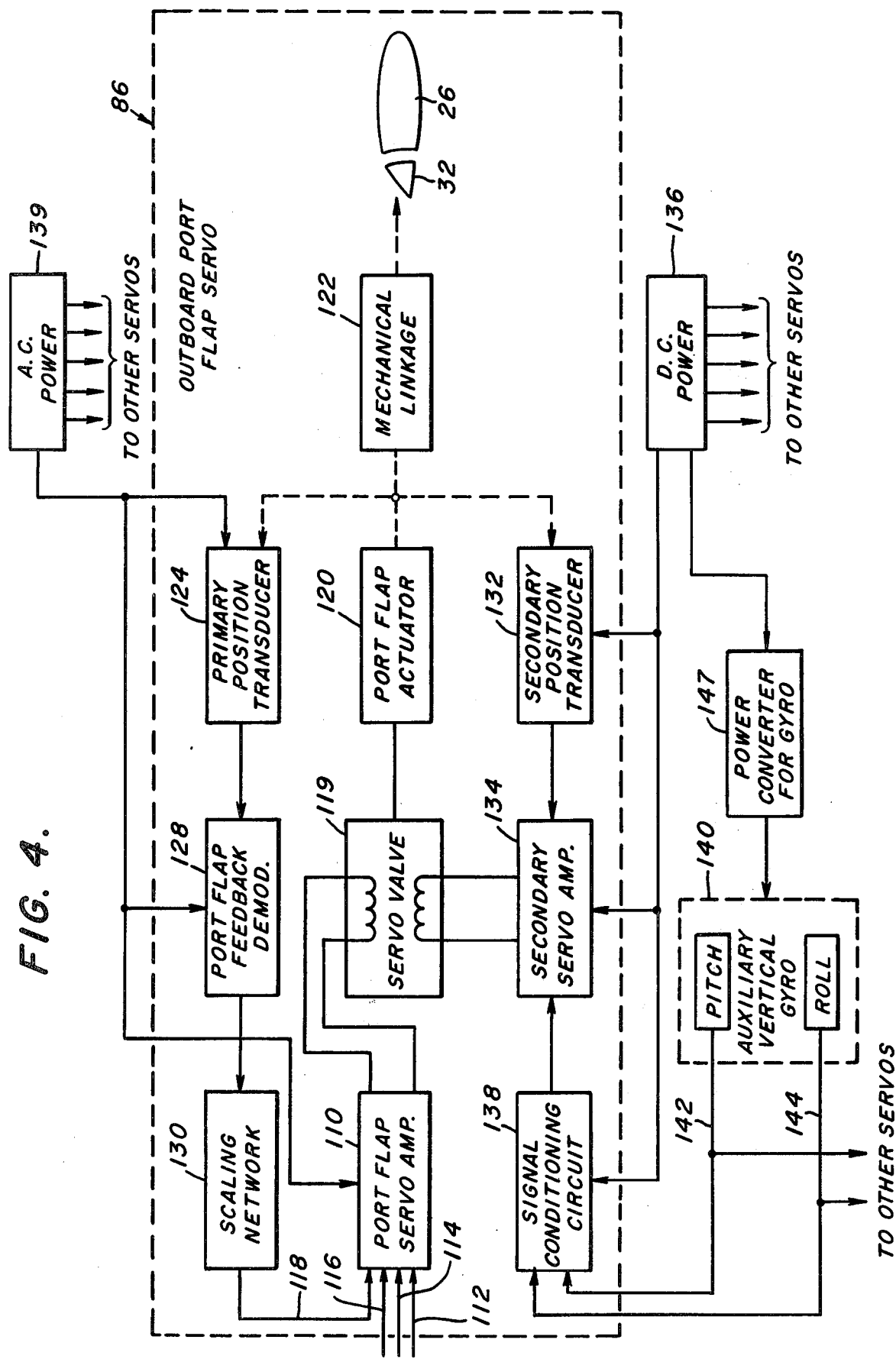
FIG. 4 shows in detail the dual servo systems of the invention for the control surfaces on the hydrofoil.

All of the servos shown in FIG. 3 are identical and, accordingly, only the outboard port flap servo 86 will be described in detail, it being understood that the remaining servos are the same. The outboard port flap servo 86 is shown in FIG. 4. It includes a port flap servo amplifier 110 which, in effect, comprises an operational amplifier having four summed inputs applied to one of its two input terminals through resistors. In the case of servo 86, the four inputs to the operational amplifier 110 include signals on leads 112–118. The signal on lead 112 is that from the pitch derivative amplifier 104; the signal on lead 114 is that from the roll derivative amplifier 80; and the signal on lead 116 is that from the port vertical accelerometer 42. The signal on lead 118 is a feedback signal proportional to actual flap position. That is, a forward flap actuator 120 is connected through a mechanical linkage 122 to the outboard port flap 32. This same mechanical linkage 122 is connected to a primary position transducer 124 which produces a signal whose magnitude varies as a function of the angular position of the flap 32 and whose polarity depends upon whether the flap is rotated upwardly or downwardly from its central or null position. This signal is applied through a feedback demodulator 128 and a scaling netowrk 130 to lead 118 and, hence, to the input of the servo amplifier 110.

The arrangement, of course, comprises a conventional servo system wherein an output signal from the servo amplifier 110 will actuate the port flap valve 119 and the port flap actuator 120 to vary the position of flap 32. When the position is varied, a feedback signal is generated at the output of network 124; and this signal persists until it nulls out or cancels the combined input signals on the other input leads 112–116 which initiated the control action.

The primary position transducer 124 as well as all of the circuitry thus far described is powered by means of an alternating current power source identified by the reference numeral 139. This power source also supplies power to all other servos. If this source should fail for some reason or other, and assuming that the auxiliary servo control of the invention is not utilized, there will be no control over the various control surfaces or flaps and they will drift to their stops due to the integrating action of the actuators and servo valves; the craft will be out of control; and a dangerous and unsafe roll or yaw attitude can be developed before the pilot manually responds and cuts back the throttles to land the craft.

In accordance with the present invention, the possibility of unsafe attitudes upon the occurrence of a power failure is prevented by means of a second servo feedback loop which incorporates auxiliary pitch and roll gyroscopes. The secondary loop includes a secondary position transducer 132, shown in FIG. 4, connected to the port flap actuator 120 and linkage 122 such that the output of the secondary transducer will be a signal proportional to actual flap position from some preset condition, which preset condition is that necessary to cause the craft to land. The output of the secondary position transducer is applied to a secondary servo amplifier 134 similar to the servo amplifier 110. The secondary servo amplifier 134 is, like the servo amplifier 110, connected to one of two windings on the port flap servo valve 119. As was explained above, the command from amplifier 134 is applied continually to the servo valve 119; but during normal operation and in the absence of a failure of power source 139, the commands from amplifier 110 will dominate and override those from transducer 132 and amplifier 134.

The secondary position transducer 131 and the servo amplifier 134 are powered by an auxiliary direct current power source 136 which will normally comprise batteries. The power source 136 also powers a signal conditioning circuit 138 in the secondary control loop as well as an auxiliary vertical gyro 140 (through converter 147 if required) (See also FIG. 3) which is common to all of the flap servos. The gyroscope 140 produces pitch signals on lead 142 which are applied to both the forward and aft flap servos. Additionally, it produces a roll signal on lead 144 which is applied to the aft flap servos 84–90 only as shown in FIG. 3. The direct current power source 136 also powers the secondary control loops in each of the remaining flap servo systems and the rudder servo system.

As shown in FIG. 4, the signals on leads 142 and 144 from the auxiliary gyro 140 are applied to the signal conditioning circuit 138 whose output varies the output of the secondary servo amplifier 134, depending upon whether the deck of the hydrofoil is level or inclined. Let us assume, for example, that the craft is banked to starboard during a turn when the primary power source 139 fails. Under these circumstances, a signal will be generated on lead 144. This signal on lead 144, after passing through the signal conditioning circuit 138, will vary the output of servo amplifier 134 to cause the port flap 26 to rotate upwardly from its original position which caused the starboard banking condition. At the same time, the starboard flaps will be caused to rotate downwardly, whereupon the craft will assume an upright position as it descends onto the surface of the water. The auxiliary gyroscope 140 and the signal conditioning circuit 138 will also sense any other rolling movement of the craft during the turn and will adjust the flaps accordingly to compensate and bring it into a level deck condition. The same applies to the pitch output on lead 142. In this case, both the forward and aft foils will be adjusted to compensate for any pitching movements and facilitate a more gentle contact with the surface of the water. As the craft assumes a level deck attitude, the signals from the gyro will drop to zero; and flap position will be dictated by the secondary position transducer 132. Because of the failure of the alternating current power source 139, the rudder goes to its center or null position.

Instead of establishing the preset condition for landing via the secondary position transducer 132, it will be appreciated that a preset signal, which will command the flaps to assume landing positions, can be applied through the circuit 138 to the servo amplifier 134. This signal, however, will be overridden in the absence of a failure of power source 139.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a hydrofoil craft of the type having at least one control surface, primary electrical circuit means including a primary servo system for controlling said surface during normal operation of the hydrofoil, and a primary source of electrical power for said primary electrical circuit means, the improvement of:

auxiliary electrical circuit means including a secondary servo system and a secondary source of electrical power therefor for automatically positioning said surface to cause said hydrofoil craft to descend from a foil-borne to a hull-borne mode of operation upon the occurrence of a failure in said primary power source; and gyroscope means in said auxiliary electrical circuit means and operable when a failure in said primary power source occurs when the hydrofoil craft is turning for automatically causing the craft to roll out of an inclined deck attitude to an essentially level deck attitude as the craft descends to a hull-borne mode of operation.

2. The improvement of claim 1 wherein said primary source of electrical power comprises a source of alternating current power, and said secondary source of power comprises a direct current power source.

3. The improvement of claim 1 wherein both the primary and secondary servo systems impose control commands on said control surface during normal foil-borne operation of the craft with the primary servo system dominating and overriding the secondary servo system.

4. The improvement of claim 1 including both pitch and roll gyroscope means in said auxiliary electrical circuit means, the pitch gyroscope means acting to at least reduce pitching movements of the craft during a descent to a hull-borne mode of operation upon the occurrence of a failure in said primary power source.

5. The improvement of claim 4 wherein said carft includes a forward control surface and an aft control surface, said pitch gyroscope means acting to actuate both said forward and aft control surfaces to reduce pitching movements.

* * * * *